US008244389B2

United States Patent
Krachtus

(10) Patent No.: US 8,244,389 B2
(45) Date of Patent: Aug. 14, 2012

(54) METHOD FOR GENERATING CONTROL DATA FOR THE MANUFACTURE OF A PRODUCT

(75) Inventor: Werner Krachtus, Schirmitz (DE)

(73) Assignee: BrandGroup GmbH, Schirmitz (DE)

(*) Notice: Subject to any disclaimer, the term of this patent is extended or adjusted under 35 U.S.C. 154(b) by 537 days.

(21) Appl. No.: 12/048,586

(22) Filed: Mar. 14, 2008

(65) Prior Publication Data

US 2008/0228302 A1 Sep. 18, 2008

(30) Foreign Application Priority Data

Mar. 15, 2007 (EP) .................................... 07104277

(51) Int. Cl.
G06F 19/00 (2011.01)
G06Q 30/00 (2012.01)
G06Q 10/00 (2012.01)
G06F 15/16 (2006.01)
G06F 17/00 (2006.01)
G06K 15/00 (2006.01)

(52) U.S. Cl. ........ 700/97; 705/26.5; 705/27.2; 705/300; 709/205; 709/246; 715/234; 715/273; 358/1.18

(58) Field of Classification Search ................ 358/1.12, 358/1.15, 1.16, 1.14, 1.18; 700/17, 95, 97; 705/26, 27, 300, 301, 26.1, 26.5, 27.1, 27.2; 709/204–206, 245, 246; 715/200–204, 273, 715/277, 234–236
See application file for complete search history.

(56) References Cited

U.S. PATENT DOCUMENTS

| 5,970,223 | A  | * | 10/1999 | Debes et al. ................. 358/1.16 |
| 6,108,492 | A  | * | 8/2000  | Miyachi ....................... 358/1.15 |
| 6,407,820 | B1 | * | 6/2002  | Hansen et al. ............... 358/1.12 |
| 6,509,974 | B1 | * | 1/2003  | Hansen ........................ 358/1.12 |
| 6,577,907 | B1 | * | 6/2003  | Czyszczewski et al. ........ 700/17 |
| 6,757,741 | B1 | * | 6/2004  | Hertling ........................ 709/245 |
| 6,832,349 | B1 | * | 12/2004 | Seamans ....................... 715/234 |
| 7,120,634 | B2 | * | 10/2006 | Jecha et al. ............. 707/999.009 |
| 7,207,001 | B2 | * | 4/2007  | Bailey et al. .................. 715/234 |
| 7,216,113 | B1 | * | 5/2007  | Goldwasser et al. ........... 706/47 |
| 7,277,925 | B2 | * | 10/2007 | Warnock ....................... 709/217 |
| 7,327,481 | B2 | * | 2/2008  | Such et al. ................... 358/1.15 |
| 7,328,245 | B1 | * | 2/2008  | Hull et al. .................... 709/206 |

(Continued)

FOREIGN PATENT DOCUMENTS

EP 0838774 4/1998

(Continued)

*Primary Examiner* — Crystal J Barnes-Bullock
(74) *Attorney, Agent, or Firm* — Price Heneveld LLP

(57) ABSTRACT

A method and a corresponding computer program product for generating control data for the manufacture of a product including a processing unit and a data-input unit, wherein the processing unit processes into a data structure data which are entered via the data-input unit and suitable for controlling production equipment for the manufacture of a product or can be transformed into such control data, the processing unit comprises at least two processing modules, a first processing module generates first control data having a first data structure and the second processing module generates second control data having a second data structure, the first processing module processes first input data from a first user and the second processing module requires second input data from a second user, and the first control data are generated for use by the second user while the second control data are generated for use for the first user.

23 Claims, 2 Drawing Sheets

U.S. PATENT DOCUMENTS

| | | | |
|---|---|---|---|
| 7,359,078 B2 * | 4/2008 | Czyszczewski et al. | 358/1.15 |
| 7,379,914 B2 * | 5/2008 | Aoki et al. | 705/40 |
| 7,536,561 B2 * | 5/2009 | Warnock et al. | 713/193 |
| 7,573,592 B2 * | 8/2009 | Hirai et al. | 358/1.15 |
| 7,751,070 B2 * | 7/2010 | Sato | 358/1.13 |
| 7,761,591 B2 * | 7/2010 | Graham | 709/233 |
| 8,015,418 B2 * | 9/2011 | Warnock et al. | 713/193 |
| 2002/0046129 A1 * | 4/2002 | Nakagawa | 705/26 |
| 2002/0083092 A1 * | 6/2002 | Simpson | 707/506 |
| 2002/0120511 A1 * | 8/2002 | Hanes | 705/14 |
| 2003/0061284 A1 * | 3/2003 | Mandarino et al. | 709/204 |
| 2004/0215775 A1 * | 10/2004 | Murray et al. | 709/225 |
| 2005/0043845 A1 | 2/2005 | Wiechers | |
| 2005/0157330 A1 * | 7/2005 | Giuliano | 358/1.15 |
| 2005/0162689 A1 * | 7/2005 | Roztocil | 358/1.15 |
| 2005/0240352 A1 * | 10/2005 | Liang | 702/19 |
| 2006/0012817 A1 * | 1/2006 | Wu | 358/1.13 |
| 2008/0162188 A1 * | 7/2008 | Kripalani et al. | 705/3 |
| 2011/0026065 A1 * | 2/2011 | Bard et al. | 358/1.14 |

FOREIGN PATENT DOCUMENTS

| | | |
|---|---|---|
| EP | 0852359 B1 | 7/1998 |
| EP | 1128657 | 8/2001 |

* cited by examiner

METHOD FOR GENERATING CONTROL DATA FOR THE MANUFACTURE OF A PRODUCT

FIELD OF THE INVENTION

The present invention concerns a method for generating control data for the manufacture of a product, particularly a typographical product, in which are provided at least one processing unit and at least one data-input unit, wherein the processing unit processes data entered via the data-input unit into a data structure, the data being suitable for controlling production equipment for the manufacture of a product or capable of being transformed into such control data.

BACKGROUND OF THE INVENTION

In modern production processes, a prominent role is played by information systems that can process process data for the eventual product such that the processed data can be used to control production equipment, since most production processes feature many automated steps. The equipment required for the automation, however, needs control data that can control the apparatus and devices accordingly. This is the case in many technical areas.

One example of a corresponding production process is that of typographical products, where the typographical product, such as a book, brochure, a poster and the like, is designed with the aid of software. The software serves to generate control data for printing equipment, which in the simplest case may be a printer, which prints out the typographical product, such as the brochure or poster. However, the automation achievable with the software and the printer is economic only if a large number of corresponding typographical products are produced. This applies in the same way to all other cases of automation. In this regard, it is possibly uneconomic for a user to invest in automation technology for isolated cases.

In many areas, this is remedied by professional service providers who bundle jobs from many clients and thereby attain the critical mass for economic use of the automation technology. This means, however, that the design of the product has to be surrendered to a service provider, a fact which can lead to unsatisfactory results or may generate additional effort during information transfer.

For this reason, various areas of technology employ systems in which service providers supply product-design software to users for free that enable the users to design the products themselves. One example of this is the individual production of typographical products, in which the service provider or manufacturer supplies corresponding software for designing the typographical work to the user for free, with the user being able to obtain the finished product only from that software provider after he or she has designed the product. However, this places substantial restrictions on the realization or implementation of the product.

SUMMARY OF THE PRESENT INVENTION

It is an object of the invention to provide a technical solution that allows an at least partly automated production process to be modified such that a user can avail himself or herself of a flexible production process, particularly as regards the ultimate implementation and realization of the product with the aid of professional tools, along with access to professional tools, especially of automation technology not only for mass production but also for one-time productions and the like. Especially, such a technical method or a corresponding device shall be simply constructed and easy to implement.

An aspect of the present invention proceeds from the recognition that elaborate automation equipment, such as processing units for data, which lead to control data for production equipment, can be flexibly deployed for later production, given appropriate allocation of the processing units to the users. The invention provides for a corresponding processing unit comprising at least two processing modules, wherein, on account of the processing modules, various control data can be generated, namely first control data having a first data structure and second control data having a second data structure. Corresponding data-input modules are allocated to the processing modules, with the first data-input module logging a first user's data and forwarding them to the first processing module, while the second data-input module logs the second user's data and forwards the data to the second processing unit for processing. Thus, there are two separate routes for two users, with the first user being the one who would like to make the product and the second user being a provider of corresponding means of production and also providing at least part of the corresponding processing units and data-input units. Reversing the allocation of the control data generated in the two separate paths to the users leads to the desired user balance, such that the first user, who would like to make the product, is provided with the opportunity to use professional processing resources, but is correspondingly free as regards the implementation of the actual product. The second user, e.g., the supplier of the production equipment and provider of the means of processing, has the option either of using his or her own means of production himself or herself or of receiving corresponding compensation for providing the second control data. Consequently, the first control data for use are generated by the second user, e.g., the provider of the means of production and means of processing, while the second control data for free use are generated for the first user, e.g., he or she who wants to make the product (buyer).

Another aspect of the present invention is a division of the production process, which can lead simply and cleverly to multiple and varied use of professional means of processing while maintaining flexibility and freedom for the subsequent implementation of the product. For example, the first user who wants to purchase the product can, where modifications occur to the product technical specifications after the processing units have been used, for example, after the typographical product has been designed, use a different supplier of printing equipment to implement and realize the product, without having to dispense with his or her preliminary work related to the processing of his or her data, for example the design of a typographical product, such as a photo book.

Accordingly, an aspect of the present invention is to provide a method which can be arranged such that the first user can choose whether only first control data or only second control data or both are generated.

Yet another aspect of the present invention is to provide a method that can be at least partially performed by one or more programmable data-processing systems, with preference given to extensive automation of the method. Correspondingly, at least parts of the data-input units or modules as well as the data-processing units or data-processing modules can be realized programmatically, that is, by software. Only the input and output of the data can be effected by means of corresponding hardware, such as keyboards, monitors, speakers, reading devices, active monitors and the like. The data-processing modules can comprise one or more software modules that process subtasks. The software modules can be any established, freely available software modules that can be integrated into the corresponding data-processing module or unit (e.g., uniquely centrally).

Accordingly, an aspect of the present invention is that the data-input modules and/or processing modules can be realized in one or at least two or more data-processing systems, which may also be physically separated from each other. For example, it is possible to use computers networked via the Internet in which, for example, a program for implementing the method, the data-input modules and data-processing modules runs on a central computer of the network, with support only provided for data-input devices or display devices via data pipelines, e.g., the Internet network. Naturally, the corresponding software for implementing the method can also be divided into several parts, with different parts allocated to the users. For instance, the first user, who would like to make the product, can run the software for realizing the first data-input module and the first data-processing module on his or her local computer, while the second data-input module and the second data-processing module are run on a computer of the second user, e.g., the provider. This allows data input, data processing and provision of the control data generated correspondingly to occur at different locations, with perhaps only the input data and/or the control data or the corresponding interim data being transmitted between the individual data-processing systems via data pipelines or a corresponding network.

In addition to the data entered by the second user, cooperation between the data-processing modules can also be such that the second data-processing module can receive and process the data of the first user in the form of the generated first control data, possibly of data generated in the interim (interim data), or of direct input data.

In the production of a typographical product, such as a photo book, a method of the present invention can proceed such that the first user, for example, can download corresponding software onto his or her local computer via the Internet, with which he or she can read in the image data and process them to a typographical product, such as a photo book.

The data generated by the program, i.e. the second control data, are then sent to the supplier of the typographical production equipment and software via the Internet, with the first user able to choose whether the supplier should produce the typographical product directly or whether he or she alternatively or additionally would like to obtain second control data that enables general, freely available control over printing production equipment.

Instead of downloading at least some of the software for generating the first control data, it is also possible for the data-processing system of the first user to be used merely as an input device while the software runs overall on the data-processing system of the second user, e.g., the provider. Accordingly, full programmatic implementation of the method is possible at the first user's, with the second user merely sending his or her data to the data-processing system of the first user via a data pipeline. Thus, the programmatic product can be a single computer program or several cooperating parts of a computer program that run especially on different, physically separated data-processing systems. The computer program product is a sequence of data which are stored on a computer storage medium, but which, for example, can be received via a series of signals.

These and other aspects, objects, and features of the present invention will be understood and appreciated by those skilled in the art upon studying the following specification, claims, and appended drawings.

BRIEF DESCRIPTION OF DRAWINGS

Further advantages, characteristics and features of the present invention are apparent from the following detailed description of embodiments using the enclosed drawings. The drawings show in purely schematic form.

DETAILED DESCRIPTION OF PREFERRED EMBODIMENTS

For purposes of description herein, it is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
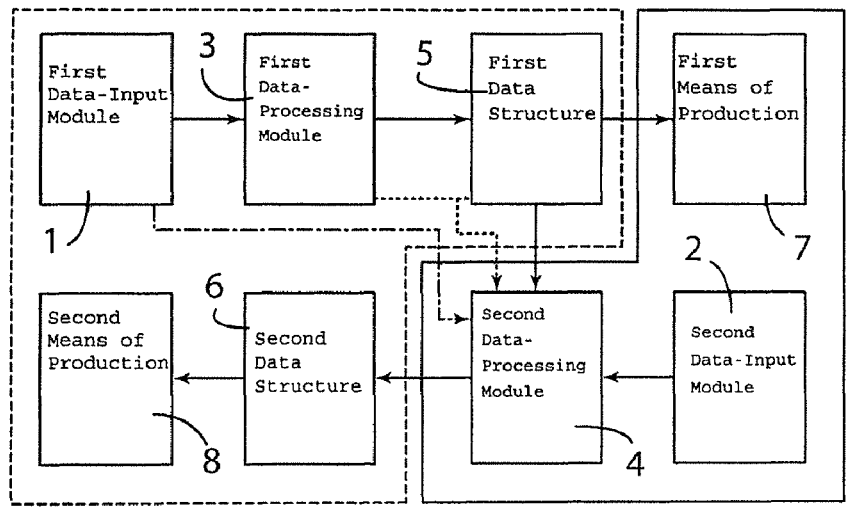
FIG. 1 illustrates a flow-chart of the method in accordance with a first embodiment.

FIG. 1 shows a purely schematic flow-chart of the inventive method using a first embodiment.

In the first embodiment, two data-input modules 1 and 2 as well as two data-processing modules 3 and 4 are present which ensure that corresponding first control data having a first data structure 5 are generated by the first data-processing module 3 and the second control data having a second data structure 6 are generated by the second processing module 4. The first control data and the second control data can be used to control first means of production 7 or second means of production 8.

In the embodiment of FIG. 1, the first data-input module 1, the first data-processing module 3 and the output of the first control data are realized programmatically in a data-processing system allocated to the first user, as indicated by the dashed frame around the corresponding blocks.

The second data-input module 2 and the second data-processing module 4 as well as the first means of production 7 are allocated to the second user, as indicated by the solid line, and are realized programmatically on a data-processing system physically separated from the data-processing system of the first user. The output of the second control data can additionally be allocated to this data-processing system.

The second means of production 8, however, is allocated to the first user or is provided or controlled by him or her.

The generation of control data for the manufacture of a product now proceeds in such a way that the first user, using the first data-processing system, enters the data required for making the product via the first data-input module 1, with the data being transferred to the first data-processing module 3, where they are processed and first control data is generated. The first control data can then be forwarded to the second user, who uses his or her first means of production 7 to produce the corresponding product.

In addition, however, the inventive method also provides a second data-processing module 4, which can process the second control data such that second control data is generated, provided that additional data of the second user is entered via a second data-input module 2. The second control data serves to control the second means of production 8, which can be chosen by the first user. Usually, the second control data has a data structure which is commonplace and can be processed by a large number of means of production, such that the first user can avail himself or herself of a wide choice of second means of production 8.

As the dotted and dashed-dotted lines show, instead of the first control data, the second processing module 4 can also process interim data which is generated by the first data-processing module 3 or can process data entered directly into the first data-input module 1.

Since, in the embodiment of FIG. 1, two physically separated data-processing systems are used, which may be formed by commercial computers equipped with standard input and output devices, the connection between the data-processing systems can be effected by any suitable connection technology, such as wireless communications technologies, wired network technologies, e.g., in accordance with Internet protocol, etc.

These connection lines between the data-processing systems can also accordingly be used to exchange the first control data or second control data.

Figure 2:
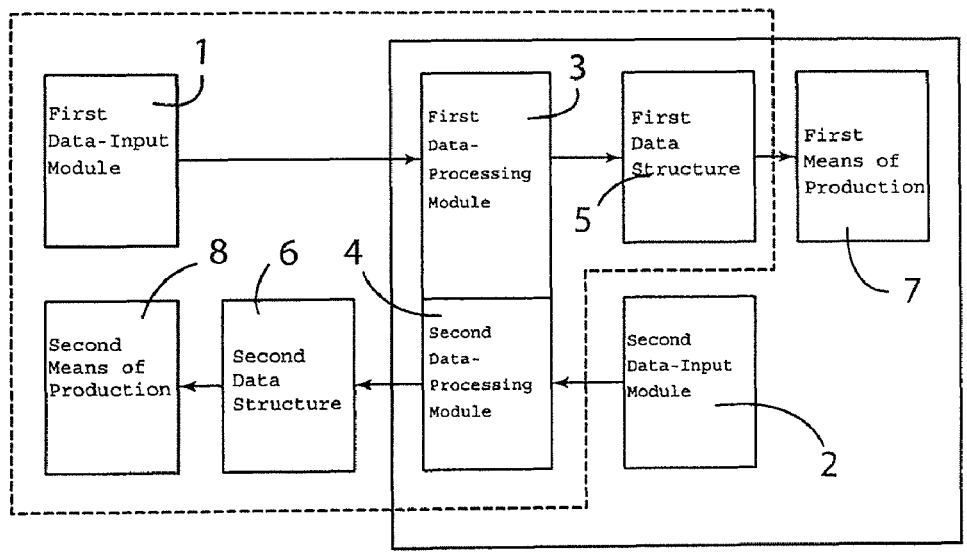
FIG. 2 illustrates a flow-chart of the method in accordance with a second embodiment.

In the embodiment shown in FIG. 2, the inventive method is realized by a single data-processing system in which both the first data-processing module 3 and the second data-processing module 4 are realized. The first data-input module 1 and the second data-input module 2 can be programmatically realized in this data-processing system, just like the corresponding output units for the first control data and the second control data. However, both the data input of the first user into the data-input module 1 and the data input of the second user into the second data-input module 2 can be realized remotely from the data-processing system via corresponding communication links, for which purpose corresponding wireless or wired communications technologies such as mobile phones, Internet and the like can be used. Similarly, the first control data for use by the second user or the second control data for use by the first user can be transmitted accordingly. In this way, the data-processing system can be operated either at the first user's or the second user's. This is shown in FIG. 2 by the different allocations of the schematic blocks to the users in the form of different rectangular areas.

Figure 3:
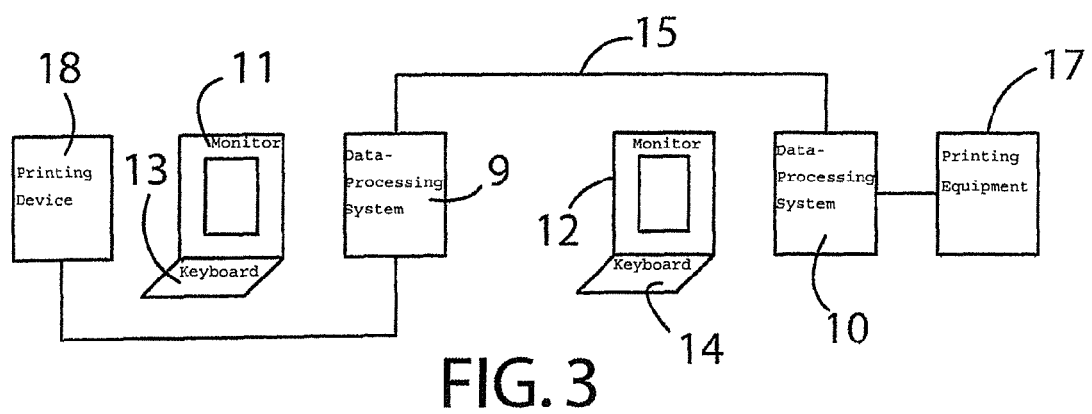
FIG. 3 illustrates a computer network for implementing the inventive method.

FIG. 3 shows in purely schematic form two commercial computers or data-processing systems 9, 10 with data-Input means, such as keyboards 13, 14, reading devices for storage media or output devices, such as monitors 11, 12 and speakers, which are connected to each other via a cable connection 15 or a network.

In accordance with the embodiments of FIGS. 1 and 2, the application can now be run such that either the first data-processing module 3 only is implemented on data-processing system 9 and the second processing module 4 is implemented on data-processing system 10 or both the first data-processing module 3 and the second data-processing module 4 are realized either on the data-processing system 9 or on the data-processing system 10. Accordingly, the necessary data, which are entered, for example, from the keyboards 13 and 14 are exchanged via data line 15.

A concrete application example is the production of a typographical product, for example, a photo book. The second user, who, for example, operates the data-processing system 10, provides the first user, who operates the data-processing system 9, with a first data-processing module 3 and a first data-input module 1 either via computing capacity on his or her data-processing system 10 or by transmitting a corresponding programmatic product via the data line 15 onto the data-processing system 9, such that the first user, using the data-processing system 9, can use storage media or reading devices for storage media residing there and the keyboard 13 to arrange photographs into a photo book, with the possibility of monitoring and checking the results of his or her actions on the monitor 11.

When the photo book is finished, the first data-processing module 3 processes the entered data to first control data, which, for example, can be sent to the data-processing system 10 of the second user via the data line 15. Without further processing or through additional revision, these first control data can then be used to control printing equipment 17, which is connected to the data-processing system 10 of the second user.

In accordance with the method, however, the first user can send the first control data to the data-processing system 10 too for processing there in the second data-processing unit 4 to second control data which can be sent back through the data line 15 back to the data-processing system 9, from where they are forwarded to a printing device 18 of the first user for production there of the corresponding typographical product, i.e. the photo book. In order that the first control data 5 may be processed in the second data-processing module 4 in the data-processing system 10, however, the data is entered via the second data-input module 2 of the second user. This data input, for example, can take the form of an acknowledgement of the existence of the acquisition of user rights for the second control data 6. In this way, it is possible for the second user to provide the first user with the first data-processing module 3 and the first data-input module 1 free of charge, since he or she ensures by means of the programmatic device that the first user pays for the use of the first data-processing module 3 or the first data-input module 1 either by having the product made at the second user's or by paying for the second control data 6.

Instead of utilization of the first control data in the second data-processing module 4, corresponding interim data or data entered directly by the first user can be used too, which are then also transmitted via the data line 15.

In the realization of the embodiment of FIG. 2 by the computer network of FIG. 3, either both the first data-processing module 3 and the second data-processing module 4 are realized in the data-processing system 9 or in the data-processing system 10, such that only the entered data and/or first or second control data are transmitted via the data line 15.

In practice, for example, a first user can therefore download a program with which he or she can create photo books from the second user via the Internet for free, e.g., from the provider of photo books. Provided he or she orders the photo book from the manufacturer who supplied the program, no further usage charges are incurred. If, however, the first user, i.e. the one who composes the photo book from his or her own pictures, decides not to obtain the photo book from the provider of the free software, he or she must pay a corresponding usage fee for the software for the provision of generally and freely usable control data.

With the technology presented, it is thus possible to realize usage-based licensing fees for software for the production of a product, with no high costs being incurred for acquiring the software.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A method for generating control data for the manufacture of a product comprising:
   providing at least one processing unit and at least one data-input unit;
   processing input data into a data structure with the at least one processing unit which are entered via the at least one data-input unit and which are suitable for controlling production equipment for manufacture of the product or can be transformed into such control data;
   the at least one processing unit comprising at least two of a first processing module and a second processing module;
   processing first input data from a first user with the first processing module;
   generating first control data having a first data structure with the first processing module where the first control data is configured such that only a second user can manufacture the product based on the first control data;
   generating second control data having a second data structure with the second processing module based on first input data from the first user or on the first control data and second input data from the second user; where the second control data is generally and freely usable by the first user for manufacturing the product; and
   wherein the first user determines whether first control data and/or second control data are generated such that the first control data is used by the second user for producing the product and the second control data is used by the first user for producing the product.

2. The method in accordance with claim 1, wherein:
   the method is performed at least partly by one or more programmable data-processing systems, wherein one data-processing system executes at least one storable data-processing program which realizes at least one processing module during execution.

3. The method in accordance with claim 1, wherein:
   the at least one data-input unit comprises at least two data-input modules.

4. The method in accordance with claim 3, wherein:
   the at least two data-input modules are at least partly realized programmatically.

5. The method in accordance with claim 3, wherein:
   the at least two data-input modules are realized in at least two data-processing systems.

6. The method in accordance with claim 5, wherein:
   the at least two data-processing systems are physically separated, wherein spatially separate data input can occur.

7. The method in accordance with claim 5, wherein:
   the processing modules are realized in a data-processing system.

8. The method in accordance with claim 5, wherein:
   the processing modules are realized in at least two data-processing systems.

9. The method in accordance with claim 5, wherein:
   the at least two data-processing systems are physically separated.

10. The method in accordance with claim 1, wherein:
    the second processing module processes the first control data of the first processing module or interim data of the first processing module or the input data of the first data-input module.

11. The method in accordance with claim 10, wherein:
    several parts with respective data sequences may be provided on different non-transitory storage media, which together lead to the execution of the method on at least one processor, with the parts of the data sequences allocated to the respective users.

12. The method in accordance with claim 1, wherein:
    data-processing systems are used which are connected by a network, such that data input, data processing and the provision of the control data can occur at different locations.

13. The method in accordance with claim 1, wherein:
    the first user enters image data for the generation of a typographical product, with the first user capable of choosing whether the typographical product is made by the second user on the basis of the first control data or whether the second user provides second control data in the form of a known print format for free use by the first user.

14. The method in accordance with claim 13, wherein:
    the known print format is a pdf (portable data format) file.

15. The method in accordance with claim 1, wherein:
    the processing modules have at least one software module which are integrated for the purpose of performing subtasks.

16. The method in accordance with claim 1, wherein:
    the control data is embodied in a data sequence on a non-transitory storage medium for execution by at least one processor.

17. The method in accordance with claim 1, wherein:
    the second control data are electronic data.

18. A method for generating control data for the manufacture of a typographical product comprising:
    providing formatting software having a first processing module and a second processing module;
    processing first input data from at least one consumer with the first processing module;
    generating first control data having a first data structure with the first processing module where the first control data is configured such that a manufacturer who provided the software can produce the typographical product based on the first control data;
    generating second control data having a second data structure with the second processing module based on the first input data from the at least one consumer or on the first control data and second input data from the manufacturer where the second control data is usable by the at least one consumer for producing the typographical product; and
    determining by the at least one consumer whether the first control data and/or second control data are generated such that the first control data is used by the manufacturer for producing the typographical product and the second control data is used by the at least one consumer for producing the typographical product.

19. A method for generating control data as in claim 18, further comprising the step of:
    downloading the formatting software to the at least one consumer over the Internet.

20. A method for generating control data as in claim 18, further comprising the step of:
    utilizing the first control data and second control data for controlling production equipment at the manufacturer for producing the typographical product.

21. A method for generating control data in accordance with claim 18, further comprising the steps of:
    formatting the typographical product to include photographic images.

22. A method for generating control data for use in producing a photographic image picture book comprising:

providing image formatting software such that the image formatting software has at least a first processing module and a second processing module;

processing first input data from at least one consumer with the first processing module;

generating first control data having a first data structure with the first processing module where the first control data is configured such that only the picture book manufacturer can produce the picture book based on the first control data;

generating second control data having a second data structure with the second processing module based on the first input data from the at least one consumer where the second control data is usable by both the picture book manufacturer and the at least one consumer for producing the picture book; and determining by the at least one consumer whether the first control data and/or second control data are generated such that the first control data and second control data is used for controlling production equipment at the picture book manufacturer.

23. A method for generating control data as in claim 22, further comprising the step of:

downloading the formatting software from the manufacturer to the at least one consumer over the Internet.

* * * * *

UNITED STATES PATENT AND TRADEMARK OFFICE
CERTIFICATE OF CORRECTION

Page 1 of 1

PATENT NO. : 8,244,389 B2
APPLICATION NO. : 12/048586
DATED : August 14, 2012
INVENTOR(S) : Werner Krachtus It is certified that error appears in the above-identified patent and that said Letters Patent is hereby corrected as shown below:

Title page, item [57] Abstract, line 16, "for use for the first user" should be
--for use by the first user--.

In the Specifications:

Column 1, line 19, delete "process" (second occurrence).

Column 4, line 7, "flow-chart" should be --flow chart--.

Column 4, line 9, "flow-chart" should be --flow chart--.

Column 4, line 26, "flow-chart" should be --flow chart--.

Column 5, line 42, "date-Input" should be --data-input--.

In the Claims:

Column 10, line 6, "and" should be --and/or--.

Signed and Sealed this
Twenty-eighth Day of May, 2013

Teresa Stanek Rea
*Acting Director of the United States Patent and Trademark Office*